United States Patent Office 2,973,463
Patented Feb. 28, 1961

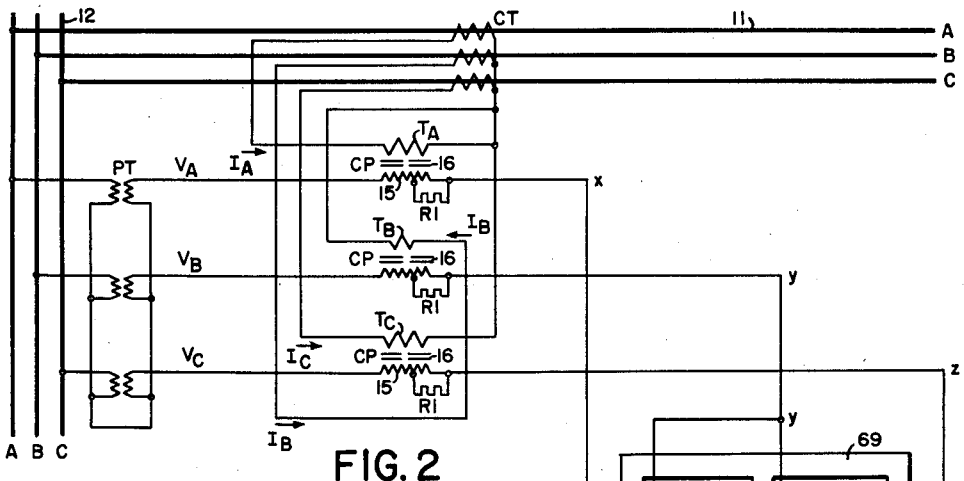
FIG. 2
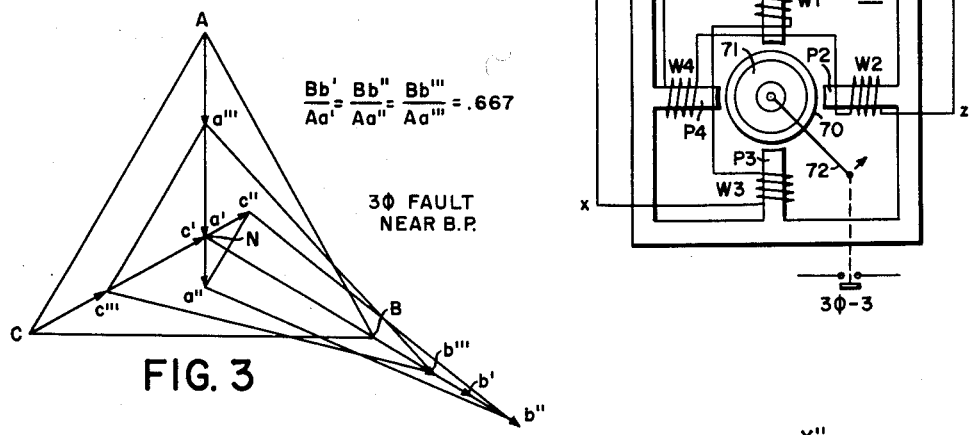
FIG. 3
3φ FAULT NEAR B.P.
$$\frac{Bb'}{Aa'}=\frac{Bb''}{Aa''}=\frac{Bb'''}{Aa'''}=.667$$
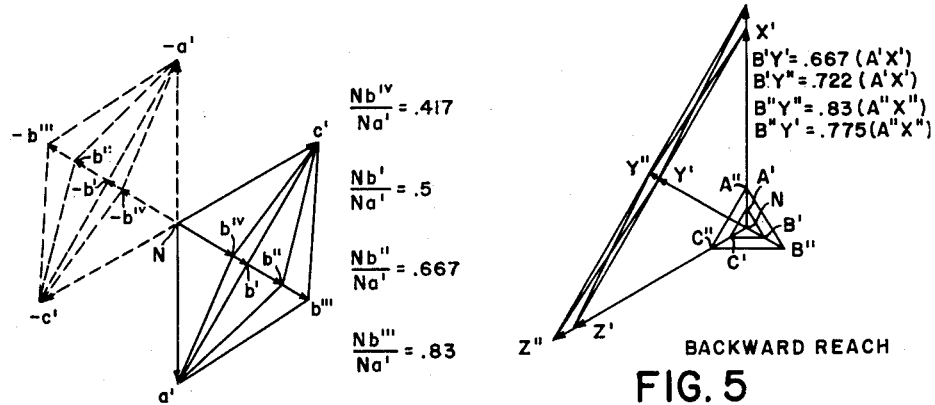
$\frac{Nb^{IV}}{Na'}=.417$
$\frac{Nb'}{Na'}=.5$
$\frac{Nb''}{Na'}=.667$
$\frac{Nb'''}{Na'}=.83$
EFFECT OF REVERSED-COMPENSATOR SETTING ON RELAY-RESPONSE TO THREE-PHASE FAULT AT BUS
FIG. 4
$B'Y' = .667 (A'X')$
$B'Y'' = .722 (A'X')$
$B''Y'' = .83 (A''X'')$
$B''Y' = .775 (A''X'')$
BACKWARD REACH
FIG. 5

2,973,463

THREE-COMPENSATOR THREE-PHASE RELAYS

Shirley L. Goldsborough, East Orange, and Jean G. Chevalier, Parsippany, N.J., assignors to Westinghouse Electric Corporation, East Pittsburgh, Pa., a corporation of Pennsylvania Filed Sept. 20, 1957, Ser. No. 685,278

7 Claims. (Cl. 317—47)

Our invention relates to a protective relaying system which uses polyphase-responsive elements energized from polyphase compensated bus-voltages at the relaying station.

Our invention is an improvement in a compensator relaying assembly which is described and claimed in an application of W. K. Sonnemann, Serial No. 685,155, filed September 20, 1957. This assembly makes use of a new type of distance relay for the fault-protection of three-phase transmission-lines or power-lines by the use of a compensator or compensators, connected in series with the bus-voltages at the relaying station, and energized from one or more of the line-currents, for deriving a set of compensated three-phase relaying voltages which reproduce some aspect of the line-voltages at some predetermined fault-location in the power-line or system, in combination with polyphase-responsive relaying-means, energized from said compensated polyphase relaying voltages, for developing an operating component which is responsive to the magnitude of the negative-sequence component of said compensated three-phase relaying voltages, and a restraining component which is similarly responsive to the magnitude of the positive-sequence component of said compensated relaying voltages; or the relaying means may operate on the principle of a polyphase induction motor, energized from said compensated three-phase relaying voltages; or the relaying means may operate on the principle of a sine relay, energized from two of the phase of said compensated three-phase relaying voltages, for operating in response to the product of the magnitude of said two phases, multiplied by the sine of the phase-angle between them.

Such a compensator relaying assembly has many advantages, including a great reduction in the number of relaying elements which are necessary for the protection of the power-line in each of the three distance-zones, zone 1, zone 2 and zone 3, which are commonly used in distance-relaying. Since the torque-producing element responds to phase-sequence components, a separate element is not needed for each phase.

The assembly of which our present invention forms a part has an additional advantage resulting from the fact that at least the first-zone polyphase-responsive compensated-voltage distance-responsive relaying-elements are inherently directional, thereby avoiding the need for a separate directional element or means in the entire assembly, and eliminating the contact-coordination problem which is entailed by the use of separate distance and directional elements. This inherent directional response is obtained both at the balance-points of the distance-responsive elements and at the relaying bus, or more exactly, at the location of the line-current transformers.

In all types of compensated-voltage distance-relays using the general principles of our invention, the relay-response is zero if the fault is located exactly at the balance-point of the relay; if the fault is nearer than the balance-point, the negative-sequence component of the impressed relay-voltage is larger than the positive-sequence component, and the relay produces response in the operating direction; but if the fault is beyond the balance-point, the positive-sequence component is the larger, and the relay-response is in the restraining direction. But since the polyphase-responsive relaying element is very sensitive to small positive and negative-sequence components, the balance point can be set very accurately, much more accurately than has heretofore been achieved.

More particularly, our present invention relates to a new type of polyphase-responsive three-compensator three-phase relaying-unit, for responding to three-phase faults on the protected power-line; and also to combinations of such a unit with other compensated-voltage polyphase responsive units which supplement the action of our unit so that the assembly as a whole will give adequate protection against all kinds of multiple-conductor faults, or faults involving more than one of the line-conductors of the protected power-line.

Our new type of three-phase-fault-responsive relaying-unit is characterized by using three line-drop compensators, one of which is reversed with respect to the polarity of the other two, so that the "reach" of the unit, in its forward or principal-looking direction, is determined by the two unreversed compensators, but the unit can be given a smaller backward reach, or no backward reach at all, by the setting of the reversed compensator, when responding to three-phase-faults. Such a unit is used principally as a third-zone element, or other element which is associated with a timer which introduces a certain time-delay in the tripping-action of the relay.

Still more specifically, our invention relates to compensated-voltage relaying units and systems of the general types just described, in which the polyphase-responsive element is a multipolar torque-producing element using a cylindrical rotor, the multipolar element preferably having four poles which are so energized as to produce two diametrically flowing fluxes, each flux being responsive to one of the two compensated voltages which are applied to said torque-producing element. Such a torque-producing element is known to combine the advantages of a high operating-torque, and a low inertia, which together spell a high rate of response and great sensitivity of response, in combination with the elimination of the objectionable double-frequency pulsating torques. Since such a two-flux torque-producing element is not a balanced three-phase element, its energizing connections should be such as to provide no flow of zero-sequence current in the torque-producing element, so as to eliminate hybrid torques which are responsive to the products of the zero-sequence current multiplied by each of the two rotational-sequence currents, namely the positive-sequence current and the negative-sequence current, respectively, which would shift the balance-point of the element.

With the foregoing and other objects in view, our invention consists in the apparatus, circuits, combinations and methods of operation, hereinafter described and claimed and illustrated in the accompanying drawing, wherein:

Fig. 2 is a simplified diagrammatic view of the basic essential features of our three-compensator three-phase fault-responsive relay, showing the use of a four-pole cylinder-type torque-producing element, and Figs. 3, 4 and 5 are vector diagrams which will be referred to in the explanation of the operation.

Figure 1:
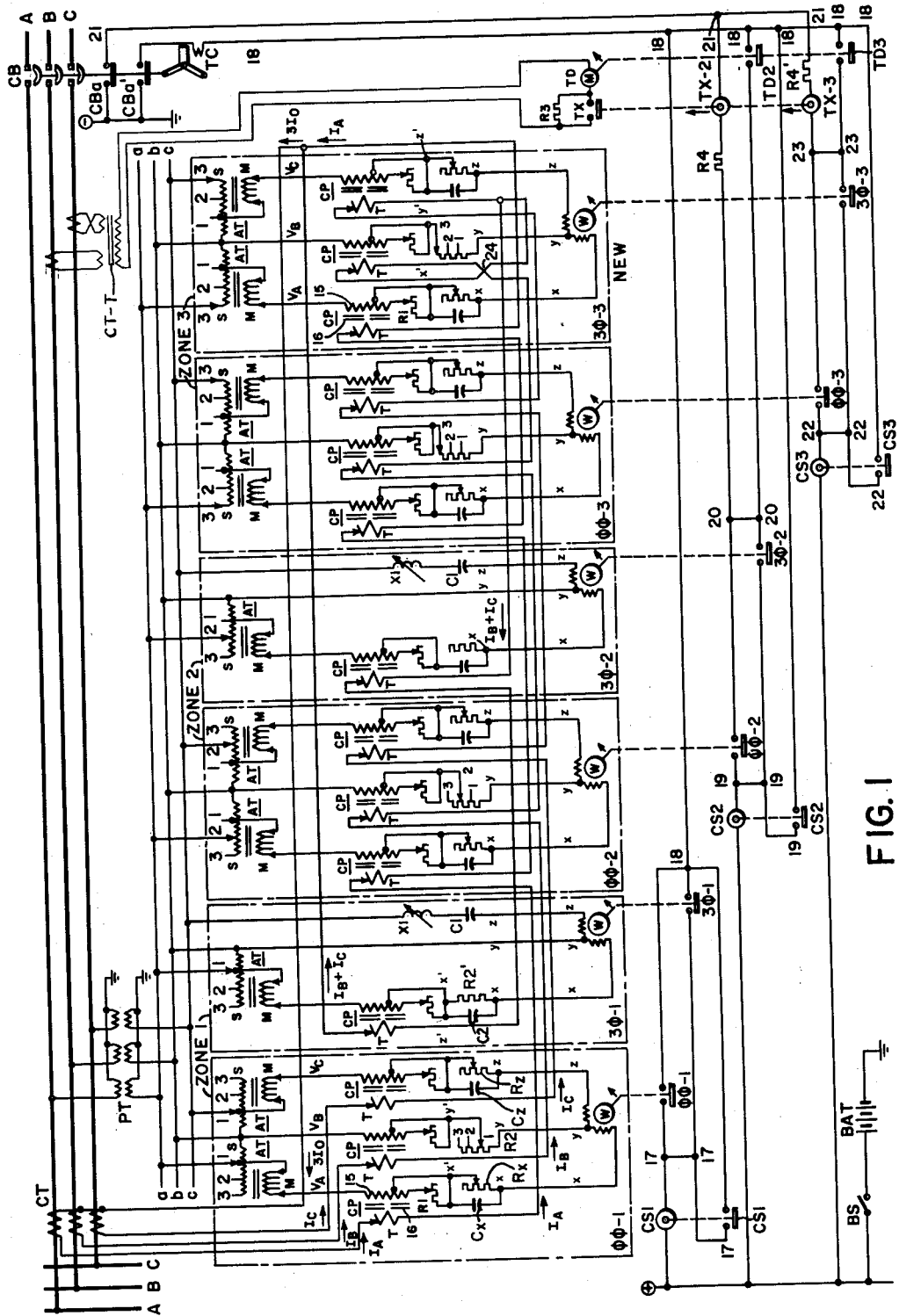
Fig. 1 is a diagrammatic view of the best form of embodiment of circuits and apparatus, which we at present prefer for embodying our invention in a non-carrier relaying equipment for protecting one terminal of a three-phase power-line against faults involving either two or three phases of the line.

In Fig. 1, we show our compensator relaying system, applied for the protection of a three-phase line-section 11, which is connected to a three-phase bus 12, at the relaying station, through a circuit breaker CB. A set of line-current transformers CT derive the line-currents $I_A$, $I_B$, $I_C$, and the star-point current $3I_0$ for relaying purposes, where $I_0$ is the zero-sequence component of the line-currents. A set of potential transformers PT is used for deriving the line or bus-voltages $a$, $b$ and $c$ for relaying purposes.

In Fig. 1, we show six relaying-units which we call Type KD units, two for each of the three zones of protection, namely, a phase-fault unit $\phi\phi$ for responding to all kinds of double-line faults, and a thre-phase unit $3\phi$ for responding to three-phase faults, for each zone, the zones being indicated by appended numbers, such as the designation $\phi\phi$–1 for the first-zone phase-fault unit or element. We also show a time-delay element or timer TD, an auxiliary timer-starting relay TX, and three contactor-switches CS1, CS2 and CS3. The contacts of the circuit breaker CB and the various relay-elements are shown in their deenergized positions, and are regarded as being raised by the operation of the respective elements. The physical connections between the various relay-contacts and the various operating-coils of the respective relays are shown as dotted vertical stems, which are intended as a convention for indicating the mechanical connection between the parts of each relay-element. As a further convention, the same legends are applied, both to the force-producing or operating-member, and to the contact-members of each relay-element, to denote their relationship. The timer TD has two contacts, which are distinguished as TD2 and TD3, which close after different time-delays suitable for the second-zone and third-zone relays, respectively.

Each of the six illustrated relaying-units operates on compensated voltages. Since the amount of the mutual compensator-impedance, which is required in the alternating-current relaying circuits, in directly proportional to the value of the derived bus-voltage which is used in said relaying circuits, we have shown, in Fig. 1, a convenient means for aiding in adjusting the effective impedance-value of each compensator, by adjusting the value of the derived bus-voltage which is applied to the relaying circuits. To this end, we show a plurality of autotransformers AT, each having three adjustable primary-connection taps numbered 1, 2 and 3 on each main autotransformer-winding S. The secondary or output circuit of each autotransformer is permanently connected to the tap S1, and this secondary circuit serially includes some fine-adjustment taps on a tertiary winding M of the autotransformer, which can add or subtract small fractional increments to the secondary voltage, according to the polarity of the connections to the M-taps. The output-circuit of the tertiary autotransformer-winding M produces the effective bus-voltage which is used in that phase of the relaying circuit.

In the preferred form of embodiment of our invention, which is shown in Fig. 1, each of the compensators CP is provided with a tapped primary winding T, having a small number of turns, and a secondary winding 15, having a large number of turns, these two windings being magnetically interlinked through an air-gapped core 16, so that the compensator-voltage which is generated in the secondary winding 15 will be substantially 90°, or less, out of phase with the current which traverses the primary winding T, depending upon the amount of effective resistance R1. The taps of the primary winding T of each compensator CP are numbered in various ohm-values which are so chosen that a correct replica of the positive-sequence line-impedance $Z_{BP}$ of the protected line 11, to a distance as far as the desired balance-point of the relay, will be obtained when $$Z_{BP} = \frac{TS}{1 \pm M}$$

where T, S and M are the numbers or fractional numbers which are marked on the chosen taps of the compensator-primary T, the main autotransformer-winding S, and the tertiary autotransformer-winding M, respectively. In this manner, we provide a very convenient means for setting the mutual impedance of the compensator to have an ohmic value which matches the line-impedance of any given line 11 at any balance-point distance from the relaying station, at which it is desired for the relay to have a zero response or a balance-point. While this particular type of balance-point compensator-adjustment is preferred, we are, of course, not limited altogether thereto.

It will be subsequently explained that, for the best results, the impedance-angle of the compensator-impedance should match the impedance-angle of the particular transmission-line 11 which is being protected. In accordance with an invention which is described and claimed in an application of Howard J. Calhoun, Serial No. 685,167, filed September 20, 1957, Fig. 1 shows a preferred way to adjust the phase-angle relation between the primary current of each compensator and its secondary voltage, without using large values of resistance, and without causing much change in the mutual impedance or the output-voltage of the compensator as a result of changes in the angle-adjustments. To this end, a small percentage of the total number of turns of the secondary winding 15 of each compensator CP are shorted through a variable resistance R1, which can be varied from R1=0, to provide a minimum impedance-angle, to R1=600 ohms, to provide a maximum impedance-angle of approximately 85° (for example); or the resistance R1 may be infinity, or an open circuit, to provide an impedance-angle of substantially 90°. The combination of a small value of resistance R1 and few shorting turns on the secondary winding 15 not only reduces the compensator-burden, but it also results in a minimum change in the mutual impedance when the value of the resistance R1 is changed for the purpose of adjusting the compensator for lines of different impedance-angles. This provides the best means which has heretofore been devised for accomplishing this purpose.

Referring, now, to the phase-fault units $\phi\phi$–1, $\phi\phi$–2 and $\phi\phi$–3 of the three zones, 1, 2, and 3, of the non-carrier Type KD relaying system shown in Fig. 1, it is a characteristic feature of these units, as described and claimed in the above-mentioned Sonnemann application, that each unit uses three identical compensators CP, connected in series with the respective open-delta voltage-terminals $V_A$, $V_B$ and $V_C$ which are supplied by two autotransformers AT. One of these two autotransformers AT has its primary connection across the delta phase $ba$ of the potential-transformer bus $abc$, while the other autotransformer has its primary connection across the delta phase $bc$. The three phase-fault relay-units $\phi\phi$–1, $\phi\phi$–2 and $\phi\phi$–3, are designed to respond to line-to-line faults and to dounble line-to-ground faults. Said units are all alike, except for their different distance-settings, or the different impedance-settings of their compensators CP, as indicated by the choice of the S-taps 1, 2 and 3, respectively, for the first, second and third zones, as shown in Fig. 1.

The output-circuits of the two autotransformers AT of each phase-fault relay-unit, such as the unit $\phi\phi$–1, thus provide an adjustable three-phase derived bus-voltage $V_A$, $V_B$, $V_C$. The primary windings T of the three compensators CP of each of these phase-fault units, such as $\phi\phi$–1, are energized from the respective derived line-currents $I_A$, $I_B$ and $I_C$ which are supplied by the line-current transformers CT. The three compensators CP substract their respective compensator-voltages from the corresponding phases of the derived bus-voltages $V_A$, $V_B$ and $V_C$ producing a three-phase compensated voltage at the points $x'$, $y'$ and $z'$, as shown for the relay-unit $\phi\phi$–1 in Fig. 1.

As decribed and claimed in Mr. Sonnemann's aforesaid application, the compensated voltages $x'$, $y'$ and $z'$ of each phase-fault relaying-unit, such as $\phi\phi$–1 in Fig. 1, are used to energize a suitable type of torque-producing relaying-element which produces no torque at all (that is, it has a balance-point), when the positive and negative-sequence components of the impressed three-phase voltages $x'$, $y'$, $z'$ are equal to each other (which is the case when the voltage-triangle has collapsed to a single line or phase), or when said voltage-triangle has completely collapsed to a point. Said torque-producing relay-element has an actuating torque when the negative-sequence voltage-component predominates, while it has a restraining or non-actuating torque when the positive-sequence component predominates. Any suitable torque-producing element which answers this basic description will suffice, whether it is a balanced element, like a three-phase induction motor, in which the internal impedances and angular spacings of the element are alike in each phase, or whether said torque-producing element is an unbalanced element, such as a two-circuit element, the two circuits of which are energized from different voltages derived from the impressed three-phase voltages $x'$, $y'$, $z'$.

There are advantages in using a two-circuit torque-producing element, as diagrammatically indicated by the wattmeter type of single-phase relay-element W in each of the six relaying units $\phi\phi$–1, $3\phi$–1, $\phi\phi$–2, $3\phi$–2, $\phi\phi$–3 and $3\phi$–3 as diagrammatically indicated in Fig. 1. There are various ways in which the two circuits for each of these torque-producing elements may be energized, from any two differing voltages which may be derived from different phases of the three-phase compensated voltages, such as $x'$, $y'$, $z'$ of Fig. 1.

In the particular circuit-connections which are shown for the $\phi\phi$–1 relay-unit in Fig. 1, the two-circuit torque-producing element W has one winding-circuit $xy$ energized across the delta-phase $x'y'$ of the compensated three-phase voltages $x'y'z'$, while its other winding-circuit $zy$ is energized across the delta-voltage phase $z'y'$. If the circuit-connections to and within the two-circuit torque-producing element W are such that no zero-sequence currents can flow in this element, as in the connections shown for the $\phi\phi$–1 unit in Fig. 1, then the torque-producing element will have no hybrid, balance-point-shifting responses to the product of the zero and positive-sequence relay-currents or to the product of the zero and negative-sequence relay-currents.

As described and claimed in the aforesaid Calhoun application, it is desirable, for best operation, in the phase-fault units, such as $\phi\phi$–1 of Fig. 1, to balance both the steady-state and the transient impedance-angles in the three circuits leading up to the common connection $y$ of the wattmeter-element terminals $xyz$. This refers to the impedances which are connected between the bus-voltage terminal $a$ and the relay-terminal $y$, the impedances which are connected between the bus-voltage terminal $b$ and the relay-terminal $y$, and the impedances which are connected between the bus-voltage terminal $c$ and the relay-terminal $y$.

As described and claimed in the aforesaid Calhoun application, the impedance-angles in these three circuits are kept substantially equal, notwithstanding the angle-changes which are introduced by changing the primary taps S1, S2 and S3 on the autotransformers AT, by introducing a resistance R2 in circuit between the points $y'$ and $y$, and providing this resistance R2 with three taps, also numbered 1, 2 and 3, which are changed simultaneously with the S-taps of the autotransformers. Dissimilar transient effects, due to sudden bus-voltage changes in the three circuits $ay$, $by$ and $cy$, are compensated for by serially including capacitors $C_X$ and $C_Z$ between the points $x'$ and $x$ and between the points $z'$ and $z$, respectively, to compensate for the inductive reactances in these circuits. The effective values of these angle-adjustment capacitors $C_X$ and $C_Z$ are adjustable by means of parallel-connected adjustable resistances $R_X$ and $R_Z$, respectively.

These transient-suppressing circuit-portion $(C_x,R_x)$, R2, and $(C_z,C_z)$ balance the phase-angles, and substantially also the magnitudes, of the impedance of the three circuits $ay$, $by$ and $cy$, with open primaries on the three compensators CP. Thus, when a close-in phase-to-phase fault occurs, behind the current transformers $ct$, one of the delta bus-voltages $V_{AB}$, $V_{BC}$, or $V_{CA}$ is collapsed to zero. If we assume the extreme system-condition of no back-feed current over the line which is being protected, the compensators do nothing to alter this collapsed voltage. Under this condition, there should be no spurious torque in the relay to cause it to respond incorrectly. The transient-suppressing elements prevent such spurious response as might otherwise be occasioned by the sudden change in the bus-voltages in the extreme case in which there may be no current in the primaries of the compensators.

Fig. 1 also shows three three-phase-fault responsive relays $3\phi$–1, $3\phi$–2 and $3\phi$–3, one for each of the three zones. The first and second-zone three-phase relays $3\phi$–1 and $3\phi$–2 embody the basic concept of an invention of S. L. Goldsborough, as described and claimed in his application Serial No. 685,168, filed September 20, 1957. The third-zone three-phase relay $3\phi$–3 embodies our present invention.

The first and second-zone three-phase relays $3\phi$–1 and $3\phi$–2 are alike, except for their distance-settings which are changed in much the same manner as has been described for the phase-fault relays $\phi\phi$–1 and $\phi\phi$–2, so that a description of one, say the three-phase element $3\phi$–1, will suffice for both.

A principal characteristic feature of this three-phase fault-responsive relay $3\phi$–1, as distinguished from the phase-to-phase fault-responsive relay $\phi\phi$–1, is that the three-phase relay $3\phi$–1 uses only a single compensator CP, which has 1.5 times the effective mutual impedance of each of the three compensators CP which are used in the phase-fault relay $\phi\phi$–1. The phase in which this single compensator CP is connected, in the relay-unit $3\phi$–1 of Fig. 1, is designated as phase A. This three-phase unit $3\phi$–1 uses a single autotransformer AT, which is similar to the autotransformers which have been described for the phase-fault relay $\phi\phi$–1. This single autotransformer AT is connected between the phases $b$ and $a$ of the relaying bus $abc$, so as to provide the adjustable voltage $V_A$, which is phase A of the three-phase bus-voltages which are used for energizing the torque-producing element W of this three-phase unit $3\phi$–1, the other two bus-voltage phases being the phases $b$ and $c$, unchanged.

In the three-phase unit $3\phi$–1, the single compensator CP has its secondary winding 15, with some of its turns shorted through a mutual-impedance angle-controlling resistor R1, connected in series with the bus-voltage terminal $V_A$, to produce the compensated voltage $x'$, as described for the phase-fault relay $\phi\phi$–1, remembering that the compensator CP in the three-phase relay $3\phi$–1 has an impedance-setting which is 1.5 times as high as in the phase-fault relay $\phi\phi$–1.

In the case of the three-phase relay $3\phi$–1 which is shown in Fig. 1, the compensator-primary T is traversed by the current $-(I_B+I_C)$, which is equal to $(I_A-3I_0)$, where $I_0$ is the zero-sequence component of the line-current, as derived by the current-transformers CT, as described and claimed in an application of J. G. Chevalier, Serial No. 685,277, filed September 20, 1957.

The cylinder-unit W, which is used in the three-phase relay-element $3\phi$–1 in Fig. 1, is basically a two-phase induction motor which produces torque in a direction which is determined by the phase-angle between the two voltages, and in a magnitude which is responsive to the product of the two voltages which are impressed upon the torque-producing element. When a three-phase fault occurs close to the bus 12 at the relaying terminal of the protected line 11, all of the delta voltages of the bus will collapse to zero. And since the three-phase element $3\phi-1$ uses only one compensator CP, there will be a voltage $x'$ in only one phase of the three-phase voltages which are supplied to the torque-producing cylinder-unit W, this phase being the phase which contains the compensator CP. This provides energization for the phase-winding $xy$ of the torque-element W. However, the energization for the other phase-winding $zy$ of the torque-element collapses to zero, in response to a three-phase line-fault near the bus, which means that the torque-element, if it responded at all under such conditions, would have only a momentary transient response, as a result of its memory-action as the uncompensated $zy$ voltage is collapsing to zero.

In order that the three-phase fault-responsive unit $3\phi-1$ may react, with accuracy or intelligence, to a three-phase line-fault close to the relaying station 12, it is desirable not only to sustain a sufficient magnitude of the uncompensated bus-voltage $zy$ which is applied to the torque-producing element, so that there can be a sufficient torque to operate the relay, but also to sustain or maintain the proper phase-angle between the two relay-voltages $xy$ and $zy$, long enough for the relay to react at all, and to know in which direction to react, because the relay-torque is determined by the product of the magnitude of the impressed voltages, multiplied by the sine of the phase-angle between these two voltages.

As described and claimed in the previously mentioned Calhoun application, the uncompensated $zy$ voltage on the torque-element W of the three-phase unit $3\phi-1$ is sustained, for a sufficiently long time, by a memory-circuit comprising a serially connected capacitor C1 and an adjustable choke-coil X1, connected in series between the bus-terminal $c$ and the terminal $z$ of the torque-producing element W. It is necessary that the duration or decrement of the memory-action of this memory-circuit C1, X1 shall be sufficiently long to enable the torque-element to produce any torque at all by the end of the time within which said torque-element must accurately respond, but it is also necessary that the tuning of the circuit which includes the memory-circuit C1, X1 shall be substantially equal to the line-frequency of the protected line 11, so that the oscillating current in this tuned circuit will not get much out of phase with the corresponding line-frequency current, during the number of line-frequency cycles during which it is necessary for the torque-element to respond, with a positive torque for faults in front of the relaying station, or with a negative torque for faults behind the relaying station.

However, the introduction of the capacitor C1 of the memory-circuit, in the relaying unit $3\phi-1$ of Fig. 1, necessarily introduces a transient disturbance, which is suppressed or compensated for, in accordance with the Calhoun invention, by connecting a second capacitor C2 between the points $x'$ and $x$, in the compensated-voltage phase $x$ of said torque-element $3\phi-1$ of Fig. 1, this second capacitor C2 being shunted by a resistor R2′ which not only enhances the effect of the capacitor C2, but also enables said capacitor to suppress transients with as little memory-action as possible.

The first and second-zone three-phase fault-responsive relay-units $3\phi-1$ and $3\phi-2$ are inherently directional, for three-phase faults which occur near the bus, in that their torque-producing relaying elements will have an operating-torque for faults located a very short distance in front of the bus, and a restraining torque for faults located a very short distance behind the bus; but these relays have no force at all, either operating or restraining, for three-phase faults which are located exactly at the bus, or so very close to the bus that the uncompensated delta-phase BC of the bus-voltage is essentially zero, unless an adequate memory-action is given to the relays, to enable them to develop a sufficient operating-torque under these conditions.

In the case of the second and third-zone three-phase fault-responsive units $3\phi-2$ and $3\phi-3$, and more particularly in the case of the third-zone element $3\phi-3$ which affords the final back-up protection for the entire protective-relay assembly, the necessary memory-action is harder to obtain, and at the same time the inherent directional discrimination (for distinguishing between forward-looking faults and backward-looking faults), is not so important, because these relays are interlocked with timer-contacts which block an effectual response of said relays, so as far as the tripping-circuits are concerned, until the expiration of certain predetermined time-delays which are respectively associated with the second and third zones of protection. This is particularly true of the third-zone three-phase unit $3\phi-3$, which will never be called upon to operate (in a non-carrier relaying system as shown), unless all other, more quickly operating relays, at other relaying stations, have failed to operate, so that, if such a three-phase fault is ever going to be responded to by the relaying system, it will have to be responded to by this last, third-zone, three-phase unit $3\phi-3$.

Particularly in the case of the third-zone three-phase relay-unit $3\phi-3$, and perhaps also in the case of the first and second-zone three-phase units, it is sometimes desirable to give the relay-unit a certain amount of backward reach, in addition to its ordinary forward reach, out to the balance-point of that relay, so as to be sure of having a strong and reliable relay-response to three-phase faults which are located precisely at the relaying bus, and for a certain distance to the rear of the relaying bus (or current-transformer CT). Such a rearwardly reaching third-zone three-phase relay is also useful as an out-of-step relay in a known carrier-type protective relaying system (not shown).

In accordance with our invention, therefore, as shown in Fig. 1, we provide a new type of third-zone three-phase relay $3\phi-3$, which differs from the three-phase fault-responsive elements $3\phi-1$ and $3\phi-2$ which are used in the other two zones of protection. This new third-zone three-phase relay $3\phi-3$ differs from the third-zone phase-fault relay $\phi\phi-3$ essentially in having one of the three compensators CP reversed in polarity, as indicated at 24 in Fig. 1. This reversed compensator is shown as being the phase B compensator, although it could have been any one of the three compensators CP. The impedance of the reversed compensator should generally be more than one-half of the impedance of either one of the unreversed compensators, although an impedance-ratio of one-half may occasionally be useful. The compensator-voltage of the reversed compensator CP adds to the line-to-neutral bus-voltage to which it is connected, and this additive compensator-voltage determines the backward reach of the unit, whereas the forward reach of the unit is determined solely by the impedance of the two unreversed compensators, which subtract their voltages from the line-to-neutral bus-voltages to which they are respectively connected.

The relaying equipment which is shown in Fig. 1 requires a timer, such as TD, which is available whenever there is a line-fault involving at least two of the line-phases. While we are not limited as to exact details, we prefer to use a single-phase timer TD, which receives an energizing current whenever a fault-current is flowing, involving at least two of the line-phases. By way of example, we have shown the timer TD as being a motor-element M which is energized from a saturable many-turn current-transformer CT–T, which is in turn energized, for example, by the difference of the line-currents $I_B$ and $I_C$.

The timer-motor TD is connected in series with the normally open make-contact TX of an auxiliary timer-relay TX. This make-contact TX is bypassed by a resistance R3, which is sufficiently small to avoid substantially open-circuiting the current-transformer CT–T when said contact TX is open, but the resistance R3 is sufficiently large to prevent the timer TD from operating when said resistance is connected in series with it.

The six fault-responsive elements of Fig. 1 have correspondingly numbered make-contacts $\phi\phi-1$, $3\phi-1$, $\phi\phi-2$, $3\phi-2$, $\phi\phi-3$ and $3\phi-3$, which are used to control certain relaying circuits which are shown as being energized from a positive direct-current bus (+).

The first circuit which is connected to the positive bus (+) in Fig. 1 is a first-zone tripping-circuit which includes the operating-coil of a contactor-switch CS1, then a circuit 17, then the make-contact $\phi\phi-1$ of the first-zone phase-fault unit $\phi\phi-1$, then a tripping-circuit 18, which extends up through the trip-coil TC of the circuit breaker CB, and finally through an auxiliary circuit-breaker make-contact CBa' to a negative bus (−), the circuit-breaker make-contact CBa' being closed when the circuit breaker CB is closed, the circuits being illustrated, however, with all switches and relays open or deenergized. Two branch-circuits are also provided between the points 17 and 18 of the first-zone protective-relaying equipment, these two branch-circuits including, respectively, the make-contact $3\phi-1$ of the first-zone three-phase unit $3\phi-1$, and the make-contact CS1 of the contactor-switch CS1.

A second-zone relaying-circuit is next shown in Fig. 1, extending from the positive bus (+) through the energizing-coil CS2 of a second contactor-switch CS2, then to a circuit 19, then through the make-contact $\phi\phi-2$ of the second-zone phase-fault unit $\phi\phi-2$ to a circuit 20, then through a resistor R4 and through an operating-coil TX-2 of the auxiliary timer-relay TX to a circuit 21, which extends up through an auxiliary make-contact CBa of the circuit breaker CB, and thence to the negative bus (−). The two circuits 19 and 20 are joined also by a branch-circuit which includes the make-contact $3\phi-2$ of the second-zone three-phase unit $3\phi-2$, consequently, the circuit 20 is energized as a result of the response of either one of the two second-zone units $\phi\phi-2$ or $3\phi-2$. This circuit 20 thus energizes the auxiliary timer-relay TX, which initiates the movement of the timer TD, whenever there is a line-fault which activates either one of the second-zone relays.

The aforesaid circuit 20 is also used to trip the circuit breaker CB at the end of a predetermined time which is determined by the closure of the second-zone contact TD2 of the timer TD, which thereupon energizes the trip-circuit 18 from the circuit 20. The TX coil, either because of its built-in resistance, or because of an externally connected resistance R4, does not draw sufficient current from the circuit 20 to pick up the second contactor-switch CS2, but the trip-coil TC draws a very heavy current as soon as the second-zone timer-contact TD2 closes, thus causing the second contactor-switch CS2 to pick up and close its make-contact CS2, which completes a circuit-connection between the circuits 19 and 18, thus sealing-in the second-zone tripping-response.

A third relaying-circuit is connected, in Fig. 1, from the positive bus (+) through the operating-coil of a third contactor-switch CS3, then to a circuit 22, then to two branch-circuits, one extending from the circuit 22 through the make-contact $\phi\phi-3$ of the third-zone phase-fault unit $\phi\phi-3$ to a circuit 23, the second branch-circuit extending from the circuit 22 through a make-contact $3\phi-3$ of the third-zone three-phase unit $3\phi-2$ to said circuit 23. From the circuit 23, a first branch-circuit continues to a second operating-coil TX-3 of the auxiliary timer-relay TX, and thence to the circuit 21, so that the auxiliary timer-relay TX will initiate the movement of the timer TD whenever there is a line-fault which activates either one of the third-zone relays.

A second branch-circuit of the circuit 23 is provided to make connection to a third-zone timer-contact TD3 which closes after a longer time-interval than is required for the closure of the second-zone contact TD2 of the timer TD. The third-zone timer-contact TD3 energizes the trip-circuit 18 from the circuit 23, and when this happens, the third contactor-switch CS3 is energized, picking up its make-contact CS3, and closing a circuit-connection between the conductors 22 and 18.

At the bottom of Fig. 1, the positive bus (+) is shown as being energized, through a battery-switch BS, from the positive terminal of a battery BAT, the negative terminal of which is grounded, to connect with the grounded negative bus (−).

Our present invention relates not only to the novel design of the reversed-compensator three-phase-fault-responsive relaying-unit $3\phi-3$, and to all uses and adaptations thereof, but it also relates to the illustrated combination of this unit with the other relaying-units using the principle of compensated-voltage polyphase-responsive torque-producing elements; or, in general, it relates to combinations of this particular unit with other compensated-voltage relaying-units which are properly responsive to the multiple-conductor faults which are not adequately responded to by our particular unit.

In all of the relaying-units of Fig. 1, in which the torque-producing element is shown as a two-phase wattmeter-type element W, which is energized from two different voltages of a compensated three-phase voltage-supply xyz, the essential thing about the torque-producing element W is that it shall be a polyphase-responsive element which developes an operating force when its impressed voltages have a negative sequence of phases, or which develops an operating force which is responsive to the magnitude of the negative-sequence component of the compensated three-phase relaying voltages, and a restraining force which is similarly responsive to the magnitude of the positive-sequence component of said compensated relaying voltages; or that the torque-producing element W shall produce an operating torque when the negative-sequence component is larger than the positive-sequence component of the compensated relaying voltages, while producing a negative or non-operating torque when the positive-sequence component is the larger; or that the torque-producing element W shall be any torque-producing element operating on the principle of a polyphase (two-phase or three-phase, or the like) induction motor (having balanced or unbalanced polyphase windings), energized from said compensated three-phase relaying voltages xyz, and having a starting-torque corresponding to $(\bar{E}_1^2 - \bar{E}_2^2)$, where $\bar{E}_1$ and $\bar{E}_2$ are the respective scalar values of the positive and negative-sequence voltages, such a motor being used as a relay to respond to the negative starting-torque, in the direction of rotation of the negative-sequence voltage-vector $E_2$; or that the torque-producing element W, if it is energized from a system of delta-connected voltages, shall be responsive to the area of the delta-triangle and to the order of phase-sequence or succession of the phases in the delta-triangle; or that the torque-producing element W, if it is a two-phase element, shall develop an operating force which is responsive to the product of the magnitudes of the two relay-voltages, multiplied by the sine of the phase-angle between them. Any relaying device, electromechanical, static, or otherwise, which will serve to close an electrical circuit sufficiently to trip a circuit breaker whenever the negative-sequence voltage is greater than the positive-sequence voltage, will do the job within the broad concept of the invention.

When the polyphase torque-producing element W is balanced, in all phases of a symmetrical polyphase set of phases, it will not respond to the zero-sequence voltage-component, even though such a voltage-component is present in the impressed voltages. When, however, the circuits of the polyphase torque-producing element W are not balanced, it is quite desirable to keep zero-sequence currents out of said element, either by keeping the zero-sequence voltage-component out of the polyphase voltages which are impressed upon the torque-producing element, or by making the connections in such a way that there is no return-path for any flow of zero-sequence current in any phase-winding of the element; thus preventing the possibility of a shifting of the balance-point of the element as a result of hybrid torques involving the product of the zero and positive-sequence components, or the product of the zero and negative-sequence components.

We believe that our invention has a very important utility in its applicability to a cylinder-type multipolar relay-element W, preferably one which has four poles, with two diametrically flowing fluxes, in accordance with the broad principles described and claimed in the Sonnemann Patent 2,380,197, granted July 10, 1945, using a lightweight conducting cylinder as the torque-producing rotor-member. Such an element has the advantage of compactness, an extremely low rotor-inertia and hence a high speed of response, and freedom from the pulsating double-frequency torques which interfere with the sensitivity of certain other kinds of wattmeter-type relays. It is to be noted, however, that the four-pole cylinder-type relay-element has only two energizing-circuits, whereas, to serve in our compensator relaying-system, it must be energized from a three-phase compensated bus-voltage, in such a manner as to respond only when the negative-sequence voltage is larger in magnitude than the positive-sequence voltage. This requires special circuit-connections for satisfactorily energizing a two-winding torque-producing element W from a source of three-phase voltages.

When these connections are made, however, using a line-current-energized compensator or compensators for compensating the polyphase bus-voltage, with the proper compensator-impedance to produce a zero relay-torque at a desired balance-point, such a combination has the very distinct advantage of completely avoiding the necessity for using directional relays in responding to faults involving more than one line-conductor. The positive and negative-sequence components of the compensated polyphase relay-voltages are equal, for faults at the balance-point, while the positive-sequence component prevails for faults which are even very slightly beyond the balance-point, and the negative-sequence component prevails for faults which are even very slightly nearer than the balance-point. (Thus the balance-point of such a combination may be set, and maintained, very accurately, more so than has heretofore been possible.)

In Fig. 2, we have shown a simplified diagrammatic view, illustrating the general basic principles of the connections for our new third-zone three-phase element $3\phi$–3, without any refinements, and also illustrating its applicability to a four-pole cylinder-type torque-element W.

In Fig. 2, the compensated three-phase voltages $xyz$ are shown as being obtained by connecting the three compensators CP between the respective potential-transformer secondary-phases $V_A$, $V_B$ and $V_C$ and the respective terminal-voltages $xyz$ of the torque-element W. It will be noted that the phase B compensator is reversed in polarity, with respect to the polarity of the other two compensators, by having the line-current $I_B$ passing to the left through the primary winding $T_B$ of this compensator, while the line-currents $I_A$ and $I_C$ pass to the right through their respective compensator-primaries $T_A$ and $T_C$. It will further be noted, in Fig. 2, that less turns are used in the primary winding $T_B$ of the pase B compensator CP, than in the primary windings $T_A$ and $T_C$ of the other two compensators. This is to indicate that the effective secondary mutual impedance of the phase B compensator CP may be only slightly more than 0.5 times the effective secondary impedances of the other two compensators. This ratio could be visualized as being 0.55 times either of the other two compensator-impedances; or 0.5 times either of the other two compensator-impedances plus a fixed number of ohms, such as 2 ohms; or larger amounts of effective compensator-impedances could be used for the reversed compensator CP which is shown in phase B, as will be subsequently discussed in connection with Figs. 3 to 5.

In Fig. 2, therefore, the torque-producing element W of our new three-phase fault-responsive element $3\phi$–3 is diagrammatically shown, in its preferred form of embodiment, as a four-pole cylinder-type element, comprising a stationary magnetizable frame 69 having four salient poles P1, P2, P3 and P4, carrying windings W1 to W4, respectively. Inside of the four poles there is a light-weight, rotatably mounted cylinder 70 of aluminum or other conducting material in which eddy currents are induced for producing a rotational torque tending to rotate the cylinder in one direction or the other, according to the predominance of the positive or negative phase-sequence component of the currents in the windings W1 to W4. Inside of the cylinder 70, there is usually mounted a stationary cylindrical magnetizable member 71 for providing a returnpath for the flux from one pole to another, thus making the flux as large as possible, and consequently increasing the available torque. Since the relay-element W operates on alternating current, its stationary magnetizable members 69 and 71 are preferably of laminated materials, while the cylindrical rotor-element 70 is preferably made of a light-weight non-magnetizable conducting material. An operating-arm 72 is attached to the rotor-cylinder 70, for actuating the contact-member $3\phi$–3 when the element W responds.

Fig. 3 is a vector-diagram illustrating the response of our new three-phase relay $3\phi$–3 to three-phase faults in the vicinity of the balance-point of the relay. The bus-voltage at the relaying station is represented by the equilateral triangle ABC, and the line-to-neutral bus-voltages are indicated at NA, NB and NC, respectively. Since the fault-conditions, during a three-phase fault, are symmetrical, it does not make any difference in which phase we insert the reversed compensator CP of Fig. 2: hence, we can denominate the reversed-compensator phase as phase B.

When a three-phase fault occurs exactly at the balance-point of the relay, in Fig. 3, the unreversed compensators in phases A and C subtract the compensator-voltages $Aa'$ and $Cc'$ from their respective line-to-neutral bus-voltages NA and NC. Since the fault is at the balance-point, and since the effective impedance of these compensators have the same magnitude and phase-angle as the line-impedance up to the balance-point, and since the phase-angle of the line determines the phase-angle of the line-current with respect to the line-to-neutral bus-voltages, the result is that the terminals $a'$ and $c'$ of the compensator voltage-vectors $Aa'$ and $Cc'$ will fall exactly at the center of gravity or neutral point N of the voltage-triangle ABC. The compensator-voltage $Bb'$ of the reversed compensator in phase B is also in alignment with its line-to-neutral voltage NB, but it adds to this voltage, instead of subtracting. Hence the compensated three-phase voltages $a'b'c'$, which are applied to the relay-terminals $xyz$ in Fig. 2, collapse to a single line or phase, as shown at $Nb'$ in Fig. 3, and the relay cannot respond, regardless of the magnitude of the voltage $Bb'$ of the reversed compensator.

In Fig. 3, the magnitude of the reversed compensator-voltage $Bb'$ is .667 times the magnitude of the unreversed compensator-voltages $Aa'$ and $Cc'$, but this ratio is chosen merely by way of illustration of a concrete example. This ratio has no effect upon the balance point of the relay, looking in the direction of the main reach of the relay, which we call its forward reach.

If, however, the three-phase fault should occur at a point which is closer to the relay than the balance-point of the relay, then the line-currents will be a little larger, in relation to the bus-voltages, than they were when the fault was at the balance-point of the relay, this being so because of the reduced line-impedance up to the actual point of fault. All three of the compensator voltage-drops will be larger, therefore, in Fig. 3, as shown by the vectors $Aa''$, $Bb''$ and $Cc''$, so that the voltage-triangle $a''c''b''$ of the compensated three-phase voltage at the relay-terminals $xyz$ will have a finite area and a negative sequence or succession of phases, so that the relay will have a finite torque, and the direction of its torque will be in the relay-operating direction, meaning that the relay will respond.

If, on the other hand, the three-phase fault had been beyond the balance-point, the compensated three-phase voltage which is applied to the relay would have a positive phase-sequence, as shown at $a'''b'''c'''$ in Fig. 3, so that the relay-torque will be in a restraining direction, and there will be no relay-response.

Fig. 4 shows the voltage-conditions which occur at the relaying station when there is a three-phase fault immediately in front of the bus (or, more properly speaking, immediately in front of the line-current transformers CT of Fig. 2). Fig. 4 then shows the effect of changing the ratio of the impedance of the reversed compensator, with respect to the impedance of each of the two unreversed compensators. When a three-phase fault occurs substantially at the bus, the bus-voltages are all reduced to the neutral point N, the bus-voltages being completely collapsed, so that the only voltages which are applied to the relays are the compensator-voltages. The voltage-drops in the unreversed compensators are shown at $Na'$ and $Nc'$ in Fig. 4, noting that these unreversed compensator-voltages have the same phase-angle as the compensator-voltages $Aa'$ and $Cc'$, respectively, in Fig. 3. It will be seen that these unreversed compensator-voltages have a phase-angle of 120° between them. Since $Na'$ and $Nc'$ are equal in magnitude in Fig. 4, they form an isosceles triangle $a'Nc'$, having a base $a'c'$, the midpoint of which is shown at $b'$. The median $Nb'$ divides this isosceles triangle into two 60° right-triangles, in which the leg $Nb'$ is equal in magnitude to ½ of the hypotenuses $Na'$ and $Nc'$. It will be noted, however, that the line $Nb'$ of Fig. 4 is in phase with the line $Bb'$ of Fig. 3, which shows the phase-angle of the voltage-drop in the reversed compensator.

Hence, in Fig. 4, if the impedance of the reversed compensator is just exactly ½ of the impedance of either one of the unreversed compensators, the voltage-drop of the reversed compensator will be $Nb'$, which brings the terminals $a'b'c'$ all into alignment, so that the terminal-voltages of the torque-producing element reduce to a straight line, and there can be no relay-operating torque in response to a three-phase fault substantially at the bus. If the impedance of the reversed compensator were larger than ½ that of the other two compensators, then the torque-producing element would be energized from a voltage-triangle such as $a'c'b''$ or $a'c'b'''$, having a negative phase-sequence, so that the relay will now respond to a three-phase fault at the bus. If, however, the impedance of the reversed compensator had been less than ½ of that of the other two compensators, then the torque-element would have been impressed with positive-sequence voltage $a'b^{iv}c'$, and the relay would not respond to a three-phase fault which is close to the bus. The ratio of the impedance of the reversed compensator, as compared to the non-reversed compensators, which have been chosen for illustrative purposes in Fig. 4, are indicated on the figure.

Fig. 4 also shows, in dotted lines, the response of the unit to a three-phase fault at the bus at the relaying station, but with the fault-location immediately back of the bus, or more exactly, back of the current-transformers CT of Fig. 2, rather than in front of the same. It will be noted that the resulting dotted-line vectors (indicated by letters prefixed by the minus sign), are just a mirror of the full-line vectors which have just been explained; and that the effect of the ratio of the reversed compensator-impedance to the two unreversed compensator-impedances is just the same, namely that the relaying-unit will respond only if said ratio is greater than ½.

Fig. 5 illustrates the backward reach of the relaying-unit, or the balance-point conditions when the fault is behind the bus, or on the other side of the bus, opposite to the main balance point or so-called forward reach, which was depicted in Fig. 3.

At a very small fault-distance of the three-phase fault, measured in the backwardly looking direction from the relaying bus, there will be a very small triangle of voltages at the bus, due to the line-impedance which is interposed between the fault-location and the bus. As the fault-location is pressed further and further back, behind the relaying bus, this bus-voltage triangle will become larger and larger, as is indicated, in Fig. 5, by the two voltage-triangles $A'B'C'$ and $A''B''C''$, representing successively greater fault-distances. If the impedance-ratio, between the reversed and non-reversed compensators, is .667 (for example), and if the fault-distance from the bus is such as to produce the smaller voltage-triangle $A'B'C'$ of Fig. 5, there are conditions in which the compensator-voltages will be as shown at $A'X'$, $B'Y'$, and $C'Z'$, wherein the first and last compensator-voltages add to the corresponding line-to-neutral voltages $NA'$ and $NC'$, respectively, while the compensator-voltage $B'Y'$ subtracts from its bus-voltage $NB'$. Fig. 5 has depicted a set of conditions in which the compensated polyphase voltages $X'Y'Z'$ collapse to a single line or phase $X'Z'$, and the relay will not respond to such a backward located three-phase fault, indicating a balance point in the backward reach of the relay. If, under these conditions, the impedance-ratio had been .722 instead of .667, the point $Y'$ would have been displaced out to the point $Y'''$, indicating that, for this ratio, the backwardly reaching balance point will not have been reached, because the compensated-voltage triangle $X'Z'Y'''$ has a negative phase-sequence or succession of phases, and the relay will still respond to the backwardly located three-phase fault.

Fig. 5 also shows, by way of further illustration, the balance-point conditions for a three-phase fault which is located a little further back of the relaying bus, resulting in a larger bus-voltage triangle $A''B''C''$, and compensator-voltages which are indicated at $A''X''$, $B''Y''$, and $C''Z''$, where the ratio of the reversed to the non-reversed compensator-impedance is .83 (for example). The conditions have been chosen so that a balance point is again obtained, under these conditions, with the compensated-voltage triangle $X''Y''Z''$ collapsing to a single line or phase $X''Z''$. If the compensator-impedance ratio had not been as large as .83, but had been, say, .775, the reversed-compensator voltage would have been reduced to $B''Y'$, resulting in a positive-sequence compensated-voltage triangle $X''Y'Z''$, indicating that these conditions are beyond the backwardly reaching balance point, so that the relay will not respond to such a backwardly located three-phase fault.

In any event, Fig. 5 shows that the backwardly reaching balance point of our new three-phase relaying-unit $3\phi-3$, as determined by the ratio of the reversed and unreversed compensator-impedances, will be much smaller than the main, or forwardly reaching, balance-point, which is determined solely by the two unreversed compensators as shown in Fig. 3 (unless the magnitude of the reversed compensator-impedance should be made a great many times larger than the magnitudes of the unreversed compensator-impedances).

Our three-phase relay also responds to the two double-line faults involving the line-conductor from which the reversed compensator is energized, but this is immaterial since all of the double-line faults are responded to by Sonnemann's phase-fault relay.

In the foregoing forms of embodiment of a relaying assembly including our invention, as shown in Figs. 1 and 2, we have shown and described certain mutual compensator-impedances which match the line-impedance of the protected power-line 11, to a predetermined point which is to correspond to the balance-point of the fault-responsive relay in question; or in some cases, we have defined the compensator-impedance as being the equivalent of a certain multiplier times the balance-point line-impedance $Z_{BP}$. The balance-point line-impedance $Z_{BP}$, to which we have been referring, includes the small resistance-component of the line-impedance, as well as the large reactive component thereof. This is shown by the provision of the resistance R1 (Fig. 1), which causes the phase-angle of the effective mutual compensator-impedance to match the phase-angle of the line-impedance of the particular power-line 11 which is being protected. The reason for this, is that we are using compensated bus-voltages, and we are using a line-drop compensator or compensators to produce either the same proportionate voltage-drop as would be obtained in the line itself between the bus and the desired balance-point of the relay, or in other cases we have used a compensator voltage-drop which is related, in certain other defined ways, to the voltage-drop in the line-impedance between the bus and the aforesaid balance-point.

By causing the compensator-impedance to have the same phase-angle as the line-impedance, and by energizing the compensator with the same line-current which causes the impedance voltage-drop in the line, we achieve the result that the compensator voltage-drop will always lie along the line of the vector which represents the line-drop voltage from which the compensator-voltage is subtracted, or to which the compensator-voltage is added, depending upon the polarity of the compensator-connections. While theoretically, some sort of possibly tolerable accuracy of response might be obtained by ignoring the resistance parts of the line-impedances, the generator-impedances, and the like (as has been done with previous types of distance-responsive relays which did not use compensated voltages in the manner which we are doing, in responding to faults), we believe that the additional accuracy of operation which is obtainable by matching the phase-angle as well as the magnitude or magnitude-ratio of the line-impedance to the balance-point, is sufficiently important to more than warrant the slight additional complication which is involved by the use of the resistor R1 or its equivalent.

In the preceding description of the fault-responsive units, such as the phase-to-phase unit $\phi\phi-1$ in Fig. 1, we have stated that the effective impedance of certain compensators is equal to the line-impedance to a fault at the desired balance point. This statement really presupposes that the line has a single impedance, which is the same in all three of the line-conductors A, B and C, which is true of a well-constructed balanced transmission-line in which there is adequate transposition of the phase-wires. In the case of a non-transposed transmission-line, the reactance parts of the impedance of the three line-wires will not all be the same, and it must be understood, in such a case, that each such compensator could be set to match the impedance of its own line-wire. We wish our description to be read with this explanation in mind.

In the preceding description of the coincidence of the phase-angle of the compensator voltage-drop with the phase-angle of the voltage to which the compensator voltage-drop is being added or subtracted, have really been assuming the general case in which the impedance of the fault itself is negligibly small, so that the voltage between the faulted phases is zero at the fault.

While we have illustrated our invention in two different forms of embodiment, and while we have explained the general principles of its design and operation in the best form and manner at present visualized, we wish it to be understood that the foregoing illustration, description and explanations are only by way of example, and were not intended as limitations, in the sense that it is possible to substitute various equivalents, or to add certain additional refinements, or to omit certain of the illustrated refinements which may not be needed in any particular case, without departing from the essential spirit of our invention.

We claim as our invention:

1. A compensated-voltage relaying-unit for responding to certain kinds of multiple-conductor faults on a three-phase transmission-line, comprising a means, energized from the transmission-line at the relaying station, for producing a set of derived polyphase voltages having the same succession of three phase-terminals as the transmission-line, a set of three compensators serially connected to said three terminals of said derived voltages and energized proportionately to the line-currents in the respective corresponding line-conductors in the transmission-line, all of said compensators having substantially the same effective impedance-angle as the transmission-line, two of said compensators being connected in the same polarity and having the same effective impedance as the transmission-line out to a predetermined balance-point of the relaying-unit, and the other compensator being connected in the reverse polarity, and a polyphase-responsive relaying element, energized from the compensated polyphase voltages, for controlling an electrical circuit when the compensated polyphase voltages have a negative sequence of phases.

2. A compensated-voltage three-phase fault-responsive relaying unit for responding to three-phase faults on a three-phase transmission-line, said unit including: a means, energized from the line-voltage at the relaying station, for producing a set of derived polyphase voltages having a phase-sequence corresponding to the line-voltages; a set of three line-drop compensators, connected in series-circuit relation to the respective phases of said derived polyphase voltages, and energized proportionately to the respective line-currents in the corresponding line-wires of the transmission-line; two of said compensators having an impedance equivalent to the line-impedance to a predetermined fault-location, whereby the compensated polyphase voltages collapse to a single phase upon the occurrence of a three-phase fault at said predetermined fault-location, whereby the compensated polyphase voltages have the same positive sequence of phases as the transmission-line upon the occurrence of a more remote three-phase fault, and whereby the compensated polyphase voltages have a negative sequence of phases upon the occurrence of nearer three-phase faults; the remaining compensator being reversed and having an impedance equivalent to at least one-half of the line-impedance to said predetermined fault-location, whereby the compensated polyphase voltages have a negative sequence of phases upon the occurrence of a three-phase fault in the vicinity of the relaying station, and also upon the occurrence of a three-phase fault at a certain distance on the other side of the relaying station, opposite to said predetermined fault-location, depending upon the excess of the reversed-compensator impedance over a ratio of exactly one-half of the line-impedance to said predetermined fault-location; and a polyphase-responsive relaying element, energized from the compensated polyphase voltages, for controlling an electrical circuit when the compensated polyphase voltages have a negative sequence of phases.

3. A protective-relaying combination, for protecting a three-phase transmission-line against all faults, involving more than one line-phase, which occur on the transmission-line between the relaying station and a predetermined fault-location on the line; said combination including a compensated-voltage three-phase relaying unit, a compensated-voltage phase-fault relaying unit, and a relay-controlled circuit-means for performing a fault-protective function for the transmission-line, in response to either of said units; said units including a means, energized from the line-voltage at the relaying station, for producing a set of derived polyphase voltages having a phase-sequence corresponding to the line-voltages; said three-phase relaying unit further including: a set of three line-drop compensators, connected in series-circuit relation to the respective phases of said derived polyphase voltages, and energized proportionately to the respective line-currents in the corresponding line-wires of transmission-line; two of said compensators having an impedance equivalent to the line-impedance to a predetermined fault-location, whereby the compensated polyphase voltages collapse to a single phase upon the occurrence of a three-phase fault at said predetermined fault-location, whereby the compensated polyphase voltages have the same positive sequence of phases as the transmission-line upon the occurrence of a more remote three-phase fault, and whereby the compensated polyphase voltages have a negative sequence of phases upon the occurrence of nearer three-phase faults; the remaining compensator being reversed and having an impedance equivalent to at least one-half of the line-impedance to said predetermined fault-location, whereby the compensated polyphase voltages have a negative sequence of phases upon the occurrence of a three-phase fault in the vicinity of the relaying station, and also upon the occurrence of a three-phase fault at a certain distance on the other side of the relaying station, opposite to said predetermined fault-location, depending upon the excess of the reversed-compensator impedance over a ratio of exactly one-half of the line-impedance to said predetermined fault-location; and a polyphase-responsive relaying element, energized from the compensated polyphase voltages of said three-phase unit, for controlling an electrical circuit when said compensated polyphase voltages have a negative sequence of phases; and said phase-fault relaying unit further including: a set of three line-drop compensators, connected in series-circuit relation to the respective phases of said derived polyphase voltages, and energized proportionately to the respective line-currents in the corresponding line-wires of the transmission-line; each of said three line-drop compensators having an impedance equivalent to the line-impedance to a predetermined fault-location, whereby the compensated polyphase voltages collapse to a single phase upon the occurrence of a line-to-line fault across any pair of line-phases at said predetermined fault-location, whereby the compensated polyphase voltages have a negative sequence of phases upon the occurrence of a line-to-line fault across any pair of line-phases between the relaying station and said predetermined fault-location, and whereby the compensated polyphase voltages have a positive sequence of phases upon the occurrence of a line-to-line fault across any pair of line-phases at any other fault-location; and a polyphase-responsive relaying element, energized from the compensated voltages of said phase-fault unit, for controlling an electrical circuit when said compensated polyphase voltages have a negative sequence of phases.

4. A multi-zone protective-relaying combination, for protecting a three-phase transmission-line against all faults, involving more than one line-phase, which occur on the transmission-line between the relaying station and a predetermined fault-location on the line; said combination including an inherently directional first-zone compensated-voltage phase-fault relaying unit; an inherently directional first-zone compensated-voltage three-phase-fault-responsive relaying unit; other-zone compensated-voltage phase-fault and three-phase-fault-responsive relaying units; a timer which begins to count time in response to any one of a plurality of said other-zone relaying units; a first-zone relay-controlled circuit-means, for performing a substantially immediate fault-protection function for the transmission-line in response to either of said first-zone relaying units; and an other-zone relay-controlled circuit-means, for performing a delayed fault-protection function, dependent upon the action of said timer, in response to any of said other-zone relaying units; all of said relaying units including a means, energized from the line-voltage of the relaying station, for producing a set of derived polyphase voltages having a phase-sequence corresponding to the line-voltages; all of said relaying units also including a compensating means which includes a compensator connected in series with a terminal of said derived polyphase voltages, and a means for energizing said compensator proportionately to the line-current which flows in a line-conductor of the three-phase transmission-line, said compensator having substantially the same impedance-angle as the line-impedance of said three-phase transmission-line; and all of said relaying units further including a polyphase-responsive relaying element, energized from the compensated voltages of the respective unit, for controlling an electrical circuit when the compensated polyphase voltages of that unit have a negative sequence of phases; the compensating means for each of the relaying units which are inherently directional having an impedance-magnitude which is so related to the line-impedance to a predetermined fault-location for that relaying unit, as to cause the corresponding polyphase-responsive relaying element to be non-responsive when a fault of a type for which the relaying unit is designed occurs at said predetermined fault-location, and so as to cause the corresponding polyphase-responsive relaying element to respond when a fault of its type occurs between the relaying station and said predetermined fault-location, and so as to cause said polyphase-responsive relaying element to have no response upon the occurrence of a fault of its type at any other location; said protective-relaying combination being characterized by said other-zone relaying units including a three-phase-fault-responsive relaying unit in which the compensating means comprises a set of three line-drop compensators, connected in series-circuit relation to the respective phases of said derived polyphase voltages, and energized proportionately to the respective line-currents in the corresponding line-wires of the transmission-line; two of said compensators having an impedance equivalent to the line-impedance to a predetermined fault-location whereby the compensated polyphase voltages collapse to a single phase upon the occurrence of a three-phase fault at said predetermined fault-location, whereby the compensated polyphase voltages have the same positive sequence of phases as the transmission-line upon the occurrence of a more remote three-phase fault, and whereby the compensated polyphase voltages have a negative sequence of phases upon the occurrence of nearer three-phase faults; the remaining compensator being reversed and having an impedance equivalent to at least one-half of the line-impedance to said predetermined fault-location, whereby the compensated polyphase voltages have a negative sequence of phases upon the occurrence of a three-phase fault in the vicinity of the relaying station, and also upon the occurrence of a three-phase fault at a certain distance on the other side of the relaying station, opposite to said predetermined fault-location, depending upon the excess of the reversed-compensator impedance over a ratio of exactly one-half of the line-impedance to said predetermined fault-location.

5. A relaying unit for responding to certain conditions on a three-phase transmission unit having line conductors A, B and C, said relaying unit comprising a device having three first input terminals A, B and C suitable for energization by a three-phase voltage, said device being responsive to the difference between the positive-phase-sequence component and the negative-phase-sequence component of a three-phase voltage applied to the terminals for operation from a first circuit-control condition to a second circuit-control condition, voltage-applying means for applying to the device modified voltages derived from said conductors at a relay station, said voltage-applying means comprising means for applying to the terminal A a voltage corresponding to the voltage to neutral of the conductor A minus a voltage corresponding to the product of the impedance of a predetermined length of the conductor A and a current traversing said conductor A, means for applying to the terminal B a voltage corresponding to the voltage to neutral of the conductor B minus a voltage corresponding to the product of the impedance of a length of the conductor B equal to said predetermined length and a current traversing said conductor B, and means for applying to the terminal C a voltage corresponding to the voltage to neutral of the conductor C plus a voltage corresponding to the product of the impedance of a length of the conductor C and a current traversing said conductor C.

6. A relaying unit for responding to certain conditions on a three-phase transmission unit having line conductors A, B and C, said relaying unit comprising a device having three first input terminals A, B and C suitable for energization by a three-phase voltage, said device being responsive to the difference between the positive-phase-sequence component and the negative-phase-sequence component of a three-phase voltage applied to the terminals for operation from a first circuit-control condition to a second circuit-control condition, voltage-applying means for applying to the device modified voltages derived from said conductors at a relay station, said voltage-applying means comprising means for applying to the terminal A a voltage corresponding to the voltage to neutral of the conductor A minus a voltage corresponding to the product of the impedance of a predetermined length of the conductor A and a current traversing said conductor A, means for applying to the terminal B a voltage corresponding to the voltage to neutral of the conductor B minus a voltage corresponding to the product of the impedance of a length of the conductor B equal to said predetermined length and a current traversing said conductor B, and means for applying to the terminal C a voltage corresponding to the voltage to neutral of the conductor C plus a voltage corresponding to the product of the impedance of a length of the conductor C and a current traversing said conductor C, said last-named length having a value of at least one-half said predetermined length and less than said predetermined length.

7. In a relaying assembly, a phase-sequence-responsive translating device having three first input terminals suitable for energization by a polyphase voltage, said device being responsive to the difference between the positive-phase-sequence component and the negative-phase-sequence component of a three-phase voltage applied to the terminals for operation from a first circuit-control condition to a second circuit-control condition, five substantially similar impedance units each having an impedance angle adjustable in the range of impedance angle of a line of a three-phase transmission system in a zone normally proctected by distance relays, each of three of said impedance units having a terminal connected to a separate one of the first input terminals and having a second terminal, three input means each effective when energized for directing a current through at least part of a separate one of said three of said impedance units which does not pass through the translating device to energize the translating device by a three-phase voltage dependent on the difference between the three-phase voltage applied to the second terminals and the voltages across the impedances, a second phase-sequence-responsive translating device having three third input terminals suitable for energization by a three-phase voltage, said last-named device being responsive to the difference between the positive-phase-sequence component and the negative-phase-sequence component of a three-phase voltage applied to the third input terminals for operation from a first circuit-control condition to a second circuit-control condition, the remaining two of said impedance units each having a terminal connected to a separate one of the third input terminals and having a fourth terminal, a sixth impedance unit having an impedance angle adjustable in the range of impedance angle of a line of a three-phase transmission system in a zone normally protected by distance relays and having an impedance magnitude smaller than the impedance magnitudes of said five similar impedance units, said sixth impedance unit having a terminal connected to the free one of said third input terminals and having a fourth terminal, three input means each effective when energized for directing a current through at least part of a separate one of the last-named three impedance units which does not pass through the second translating device to energize the second phase-sequence-responsive translating device by a three-phase voltage dependent on the difference between two phases of a three-phase voltage applied to the fourth terminals and the voltages across said remaining two of said impedance units and on the sum of the remaining phase of the last-named three-phase voltage and the voltage drop across the sixth impedance unit, the impedance value of the sixth impedance unit being substantially smaller than the impedance values of said similar impedance units.

References Cited in the file of this patent
UNITED STATES PATENTS

| | | |
|---|---|---|
| 2,221,602 | Parsons | Nov. 12, 1940 |
| 2,295,398 | Griscom | Sept. 8, 1942 |
| 2,408,208 | Goldsborough | Sept. 24, 1946 |
| 2,445,429 | Goldsborough | July 20, 1948 |